United States Patent
Rokoff et al.

(10) Patent No.: US 6,606,374 B1
(45) Date of Patent: Aug. 12, 2003

(54) SYSTEM AND METHOD FOR RECORDING AND PLAYING AUDIO DESCRIPTIONS

(75) Inventors: Kenneth I. Rokoff, Potomac, MD (US); John R. Ramsay, Herndon, VA (US); J. Christopher Wiseman, Centreville, VA (US); Timothy M. Price, Rockville, MD (US)

(73) Assignee: Convergys Customer Management Group, Inc., Cincinnati, OH (US)

( * ) Notice: Subject to any disclaimer, the term of this patent is extended or adjusted under 35 U.S.C. 154(b) by 0 days.

(21) Appl. No.: 09/412,325

(22) Filed: Oct. 5, 1999

Related U.S. Application Data
(60) Provisional application No. 60/139,474, filed on Jun. 17, 1999.

(51) Int. Cl.[7] .................................................. H04M 1/64
(52) U.S. Cl. ............................. 379/88.16; 379/88.17; 379/93.12; 705/27
(58) Field of Search ............................. 379/88.01, 88.04, 379/88.11, 88.13, 88.14, 88.16, 88.17, 88.22, 88.23, 88.24, 88.25, 93.12, 93.17, 99.25, 101.01, 900, 907, 917; 705/1, 14, 16, 26, 27, 28; 715/501.1, 513

(56) References Cited

U.S. PATENT DOCUMENTS

| | | | |
|---|---|---|---|
| 4,049,915 A | 9/1977 | Danner | |
| 4,523,055 A | 6/1985 | Hohl et al. | |
| 4,860,342 A * | 8/1989 | Danner | 379/110.01 |
| 5,243,643 A | 9/1993 | Sattar et al. | |
| 5,283,731 A * | 2/1994 | Lalonde et al. | 705/1 |
| 5,351,276 A | 9/1994 | Doll, Jr. et al. | |
| 5,375,210 A * | 12/1994 | Monnes et al. | 710/10 |
| 5,404,295 A * | 4/1995 | Katz et al. | 707/2 |
| 5,526,353 A | 6/1996 | Henley et al. | |
| 5,557,659 A | 9/1996 | Hyde-Thomson | |
| 5,583,864 A * | 12/1996 | Lightfoot et al. | 370/396 |
| 5,625,675 A | 4/1997 | Katsumaru et al. | |
| 5,654,886 A | 8/1997 | Zereski, Jr. et al. | |
| 5,675,507 A | 10/1997 | Bobo, II | |
| 5,732,216 A | 3/1998 | Logan et al. | |
| 5,737,395 A | 4/1998 | Irribarren | |
| 5,793,980 A | 8/1998 | Glaser et al. | |
| 5,799,063 A | 8/1998 | Krane | |
| 5,845,076 A | 12/1998 | Arakawa | |
| 5,884,262 A | 3/1999 | Wise et al. | |
| 5,907,320 A * | 5/1999 | Beesley et al. | 345/302 |
| 5,909,670 A * | 6/1999 | Trader et al. | 705/14 |
| 5,915,001 A * | 6/1999 | Uppaluru | 379/88.22 |
| 6,064,967 A * | 5/2000 | Speicher | 705/1 |
| 6,102,287 A * | 8/2000 | Matyas, Jr. | 235/380 |

FOREIGN PATENT DOCUMENTS

| | | |
|---|---|---|
| EP | 0 782 318 A2 * | 7/1997 |
| EP | 0 889 627 A2 * | 1/1999 |

OTHER PUBLICATIONS

Harry Newton, Newton's Telecom Dictionary 8th Ed., 11/94, Flatiron Publishing, Inc., ISBN 0–936648–60–0, pp. 569–570.*

* cited by examiner

*Primary Examiner*—Fan Tsang
*Assistant Examiner*—Roland G. Foster
(74) *Attorney, Agent, or Firm*—Frost Brown Todd LLC; Ria Farrell Scholmat; Steven J. Goldstein

(57) ABSTRACT

A system for recording an audio description of an item that may be offered for sale over the Internet makes use of an Interactive Voice Response (IVR) system. A user wishing to make an audio recording accesses the IVR system via a telephone or a computer, and interacts with the IVR system to record, edit and/or re-record the audio description of the item. The IVR system can then place the recorded audio description in one or more electronic data files on an Internet server. The data files can then be accessed, via the Internet, and played over user computers. The process of recording an audio description may also include a prompt for the user to input a predefined control number. Such a predefined control number could be assigned by an Internet content provider before the audio recording is created. The IVR system could then store the audio recording, on an Internet server, in a data file having a filename that reflects the control number. This would allow the content provider that originally assigned the control number to access the data file based its own the control number. In alternate embodiments, the IVR system may simply transfer the recorded audio descriptions, in the form of electronic data files, to an Internet based content provider. The content provider would then place the files on an Internet server so that users could access and play the audio recordings.

21 Claims, 6 Drawing Sheets

SYSTEM AND METHOD FOR RECORDING AND PLAYING AUDIO DESCRIPTIONS

This application claims the benefit of Provisional Application No. 60/139,474, filed Jun. 17,1999.

BACKGROUND OF THE INVENTION

1. Field of the Invention

The invention relates to systems and methods for recording and playing audio descriptions of items. The audio descriptions can be used to describe items that are presented via the Internet.

2. Background of the Related Art

The Internet has many web pages that are devoted to describing particular items or areas of interest. This can include company and association web sites that provide information about a particular entity. Also, many businesses maintain and operate web sites that are designed to sell products and services. In all of these cases, the web sites are designed to describe items, products and services.

In addition, certain services available over the Internet allow private individuals to place items for sale over the Internet. This can include auction sites that allow people to sell items in an auction fashion, as well as traditional classified advertisements. Typically, such services will allow a seller to register a sale item using an Internet web site. The seller will provide a text description of the item, and in some instances, the seller may also be able to provide a graphical file that shows a picture of the item.

SUMMARY OF THE INVENTION

The invention is a system and method for allowing users to record audio descriptions of items, products, services, or even businesses that are presented on Internet web sites maintained by content providers. The audio recordings are then placed on a server, in a suitable electronic format, so that the audio recordings can be accessed by the content provider, or by an end user, and played to a user accessing the web sites.

For instance, a system and method embodying the invention allows a seller placing an item for sale on an Internet web site to provide an audio description of the item, in addition to providing a text description and/or providing a picture of the item. Similarly, businesses can record audio descriptions of items presented on an Internet web site that can then be played to users accessing the web site. The use of a separate service for recording the audio descriptions and making them available over the Internet eliminates the need for an individual or a small business to invest in the equipment and associated training that would enable them to create their own recordings.

A system embodying the invention can include an interactive voice response (IVR) system that allows a user to call a telephone number using a standard telephone. Once the user connects with the IVR system, the user would interact with the system to record, edit, or re-record an audio description. The process would typically include providing an item number, and/or a user identification number, and/or a password. This would allow the IVR system to store the audio description against some type of control number. The user identification number and/or password would allow the IVR system to verify that a caller is authorized to make or edit a recording.

An audio recording could also be created using a personal computer with audio capabilities. In this instance, the personal computer could interface with an IVR system similar to those used with telephone systems, or with an Internet server that includes an interface for recording the audio descriptions. In either event, the user would respond to prompts to record and/or edit an audio recording. The prompts could be audio prompts, a graphical interface, or a combination of a graphical interface and audio prompts.

A system embodying the invention would then store the audio recording in one or more electronic files that are accessible to a content provider, or the end user. If the content provider is an Internet based service, this could include storing files on a server that is accessible over the Internet. In some embodiments, the electronic files would be stored on a server associated with a separate IVR system. In other embodiments, the files could be transferred to a server associated with the content provider. The IVR system might also convert an audio recording into an electronic file format that allows the recording to be easily accessed and played by users accessing a content provider.

Because audio recordings can be stored against a predefined control number, an IVR System configured to record audio descriptions can be easily configured to work with existing content provider web sites. For instance, a content provider such as a listing service is likely to already be assigning some type of control number to each of the items presented via the service. An IVR system embodying the invention can be configured to store audio recordings for the items in electronic files that reflect the control numbers already assigned by the listing service. Thus, a listing service need only add a play item or icon to its existing Internet interface to begin using the audio descriptions. The listing service need not make any other changes to its existing numbering scheme, and the associated software. This allows an IVR system embodying the invention to be easily integrated with existing content providers, and it allows the IVR system to provide audio descriptions for items that have already been placed on a content provider's web site.

When a user who has accessed a content provider's web site is viewing an item, the user would be able to select an option that would cause the content provider to access the audio recording files and to play the audio recording over the user's computer. This could include selecting an icon that appears on the user's computer screen. Alternatively, selecting the play option offered by a content provider could cause the user's computer to directly access files stored at a separate location, such as an IVR system server, to play the audio recording.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Figure 1:
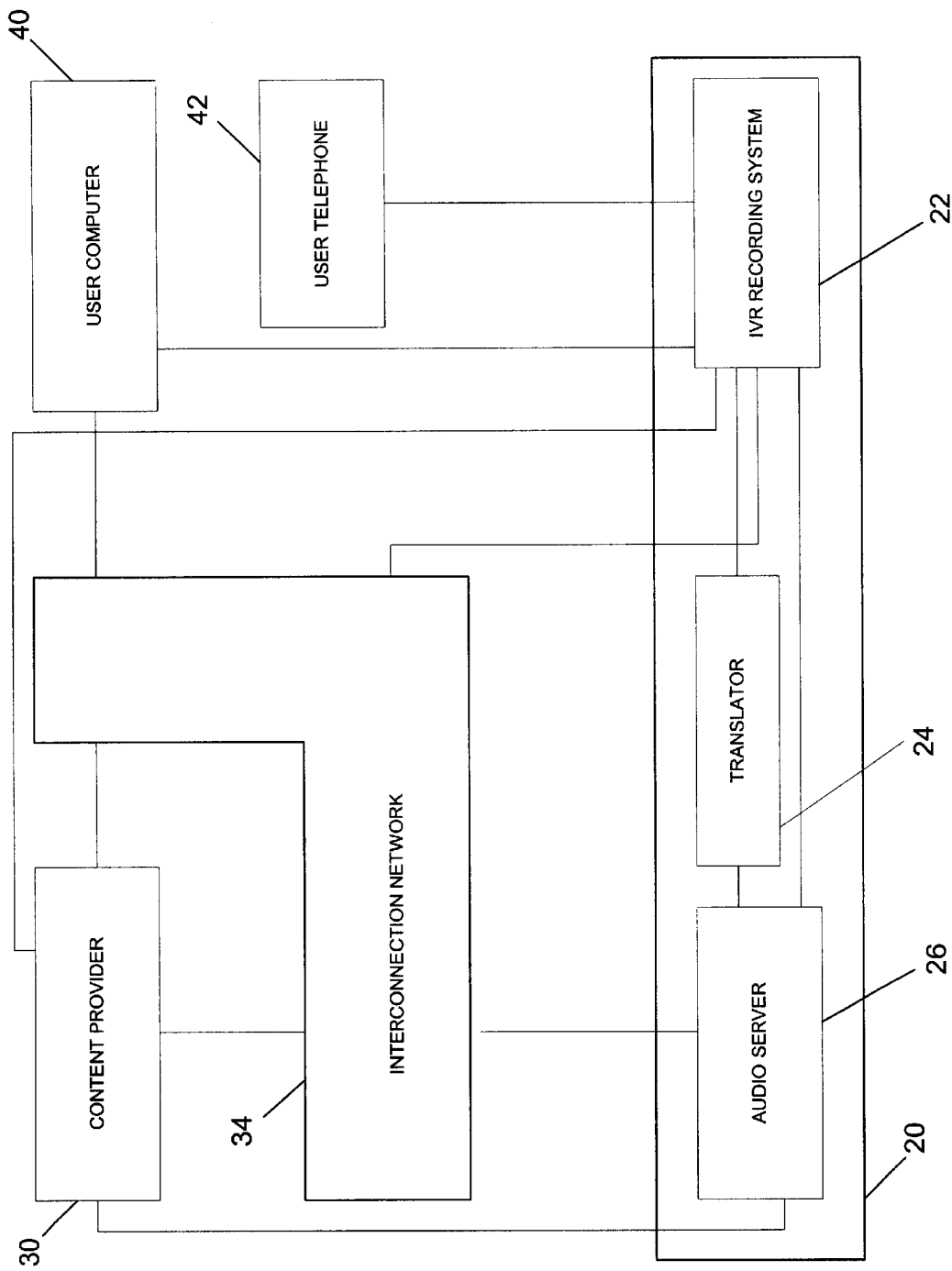
FIG. 1 is a block diagram showing components of a system embodying the invention.

FIG. 1 shows the elements of a first embodiment of a recording system 20. Although many interconnections between the elements are shown in FIG. 1, only some of the interconnections may be provided in any particular embodiment of the invention.

The recording system 20 shown in FIG. 1 is capable of recording an audio description, and placing the recorded audio description in electronic files that are accessible to a separate computer system. The recording system 20 includes an interactive voice response (IVR) system 22 which is designed to interact with a user to allow the user to make or edit an audio recording.

The IVR system can be configured to receive telephone calls from traditional wired or wireless telephones 42 through a standard telephone network. In this instance, the IVR system can be configured to prompt a user with audible menus or questions which are designed to lead the user through the process of recording and/or editing an audio description. The user may navigate through the menus by pushing the buttons on the telephone, or by speaking predetermined voice commands into the telephone. If the user pushes buttons on the telephone keypad, the telephone will generate standard dual-tone-multi-frequency DTMF) sounds that can be interpreted by the IVR system. If the user responds by speaking voice commands, the IVR system would have a speech recognition capability that would allow the IVR system to interpret and understand the user's verbal commands.

In other embodiments of the invention, the IVR system may be connected to a user's computer 40 via a direct telephone-modem connection, via a computer network connection, or via the Internet. In this instance, the audio and/or graphical capabilities of the user's computer 40 would be utilized to lead the user through the process of recording and/or editing an audio recording. The user could be prompted with a graphical interface that appears on the user's computer display screen, and/or with audible questions and prompts that are played over speakers connected to the user's computer. The user would then respond to the prompts and questions by pressing keys of the computer keyboard, or by using a pointing device, or by speaking commands into a microphone connected to the computer.

The user's computer 40 would also be utilized to transmit the audio description to be recorded by the IVR system. For instance, the user could speak an item description into a microphone connected to the computer. The user's computer 40 would then translate the spoken description into electronic data that is transmitted to the IVR system. The IVR system would receive and possibly interpret the electronic data and use the electronic data to make an audio recording. In some embodiments, the user's computer 40 could be used to edit an audio description, and possibly to add music or other sounds that are a part of the audio description or that are to be used as background for the audio description. Once the user's computer 40 has created the audio description, the user's computer 40 would transmit the audio description to the IVR system 22 in the form of electronic data files.

Regardless of how an audio recording is created, once it is completed, the audio recording could be stored in one or more electronic files that are stored on an audio server 26. The audio server 26 would make the electronic files, which include the audio recording, available to other computer systems. The audio server 26 can be located with the other elements of the recording system 20, or the audio server 26 could be located at a remote location.

In other embodiments, the audio recording may be made in a first electronic format, and the audio recording could then be converted into a second electronic format that will allow the audio recording to be more easily accessible to different computer systems. If conversion from a first electronic format to a second electronic format is required, the conversion could be accomplished by a translator 24. The translated electronic data files, which represent the same audio recording, would then be stored in the audio server 26.

In a particular embodiment of the invention, the initial recording could be made in a VOX format, and the VOX format recording would be converted into a digital WAV file format. The WAV file format is currently recognized by a wide variety of different types of computer software. Thus, audio recordings that are available in the WAV file format should be usable and playable on a wide variety of currently available platforms. Of course, the audio recording could be recorded in a different format, and the audio recording could be converted into any type of audio recording format.

In the block diagram shown in FIG. 1, an interconnection network 34 can be used to establish an electronic link between the recording system 20, and other electronic devices. The interconnection network 34 could be the Internet, any type of computer network such as local area networks and wide area networks, or a telephone network that allows two electronic devices to communicate with one another via modems or digital signals.

As shown in FIG. 1, a content provider 30 can interface with the recording system 20 via the interconnection network 34. The content provider 30 could be an auction service or a classified advertisement service that is accessible over the Internet, or any other type of service or web site service that provides descriptions of items or services. In any event, the content provider 30 would be configured to access the audio descriptions stored on the audio server 26 of the recording system 20. The content provider 30 would then play the audio recordings for users of the service.

If the content provider 30 is an Internet accessible sales service, the content provider 30 could be configured to access the audio recording files stored on the audio server 26 via the Internet. Alternatively, the content provider 30 could be connected to the audio server 26 via some other type of computer network, or via a telephone line connection. Typically, in the case of an Internet based service, a web page describing an item would include an icon that is selectable by a user. Selecting the icon would cause the content provider service to access the electronic recording file stored on the audio server 26, and the audio recording would be played over the user's computer. In an alternate embodiment, the content provider service could direct an end user's computer to directly access and play the files stored on the audio server 26.

In other alternate embodiments, the content provider 30 could include the ability to store the electronic files that represent audio descriptions. In this embodiment, once the recording system 20 records an audio description and converts the audio recording into electronic data files, the electronic data files would be transferred to the content provider 30. This would eliminate the need for the content provider system 30, or an end user, to remotely access the electronic files representing audio descriptions.

In the embodiments shown in FIG. 1 and described above, a recording system 20 that is separate from a content provider 30 is used to record audio descriptions. In other embodiments of the invention, the content provider itself may have the capability of interacting with a user to record and/or edit audio recordings. One such embodiment is shown in FIG. 2.

Figure 2:
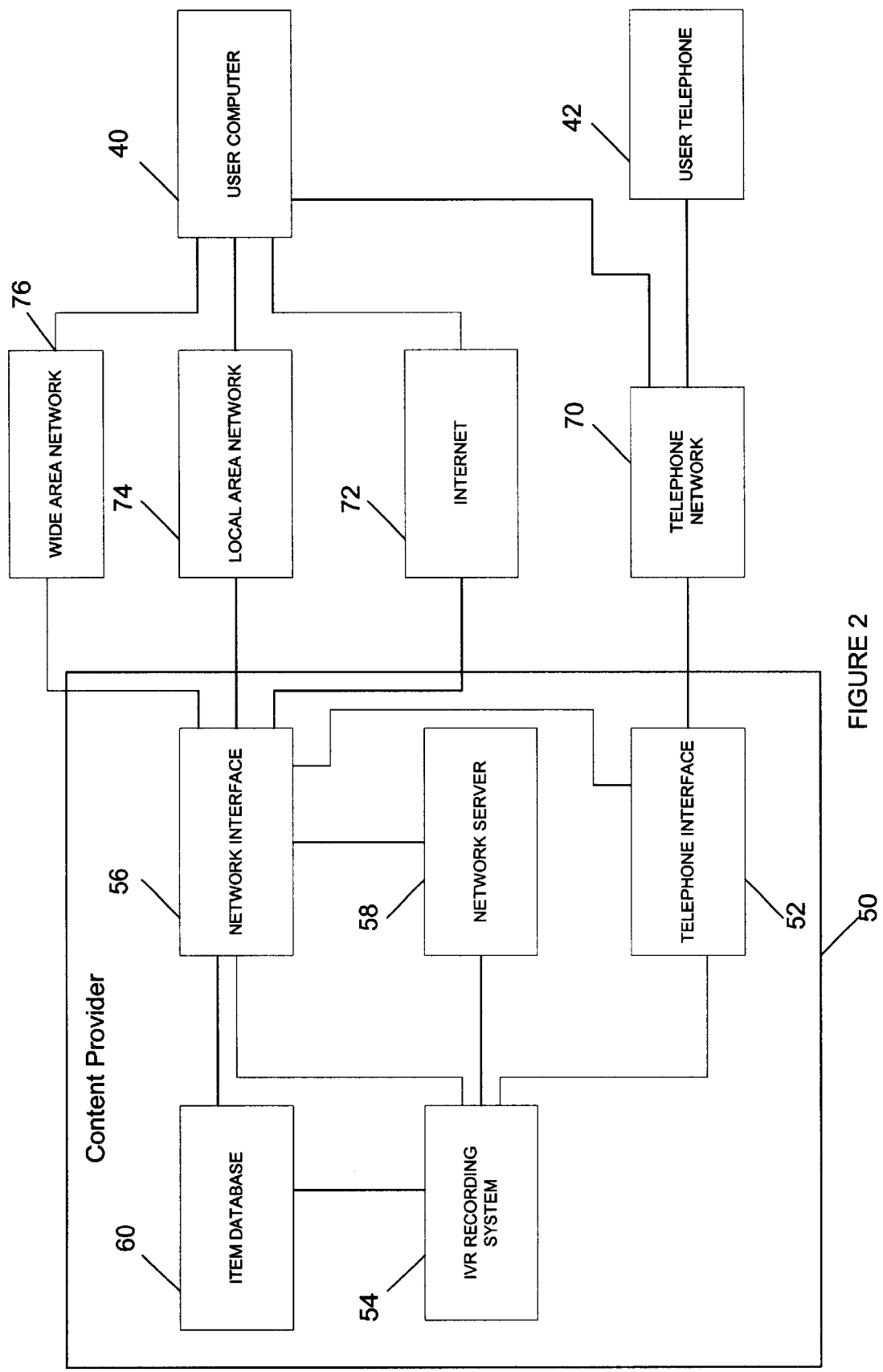
FIG. 2 is a block diagram of a content provider system embodying the invention that is connected to a user via a telephone network, and/or via a computer network.

In the embodiment shown in FIG. 2, a content provider 50 includes an item database 60 and an IVR recording system 54. The item database 60 includes descriptions of items that are made available to users of the content provider 50. The IVR recording system 54 is configured to interact with a user and to lead the user through the process of recording and/or editing an audio description.

In the embodiment of the system shown in FIG. 2, the IVR system 54 could communicate with a user via a telephone interface 52, which is connected to a telephone network 70. The telephone network 70, in turn, could be connected to a user's telephone 42 or to a user's computer 40. When a user telephone 42 is utilized, the IVR system would lead the user through the process of recording and editing an audio description using audible prompts and menus that are played over the user's telephone 42. The user would respond by pushing keys of the telephone 42, or by speaking voice commands. In the end, the IVR recording system 54 would record an audio description that is spoken by the user into the user's telephone 42.

In alternate embodiments, the IVR recording system 54 could interact with a user via a user's computer 40. The user's computer could communicate with the IVR recording system 54 in a variety of different ways. In one embodiment, a modem of the user's computer 40 could be linked to the telephone interface 52 of the description listing service 50 via the telephone network 70. In another embodiment, the user's computer could interface with the IVR recording system 54 via a network interface 56. The user computer 40 could be linked with the network interface 56 of the description listing service 50 via a wide area network 76, a local area network 74 or the Internet 72.

When a user's computer 40 is used to interface with the IVR recording system 54, the IVR system 54 could prompt or question the user with audio information played over speakers connected to the user's computer, or with a graphical interface that is presented on a display screen of the user's computer 40. The user would respond by pressing keys on the keyboard of the user's computer 40, or by using a pointing device, or by speaking commands and/or descriptions into a microphone connected to the user's computer 40.

In the end, the user's computer 40 would send data representing an audio description to the IVR recording system 54, via the network interface 56 and the appropriate network connection. The IVR system would then record the audio description in data files that may be stored on a network server 58. The data files could be stored in any electronic data file format that is appropriate. In addition, and as described above, the audio description may be initially recorded in a first data file format, then translated to a second data file format.

Once an audio description of an item has been recorded, it can be made available to a user of the content provider 50 via the network interface 56 or the telephone interface 52. The user could access the content provider 50 using a user computer 40, or a user telephone 42. In preferred embodiments of the invention, the content provider 50 would be accessible over the Internet, and the user would access the system using a computer 40. The user could access textual or graphical information about an item from the item database 60, and corresponding audio descriptions from the network server 58. In some embodiments, the item database 60 may be stored on the same network server as the audio descriptions.

Figure 3:
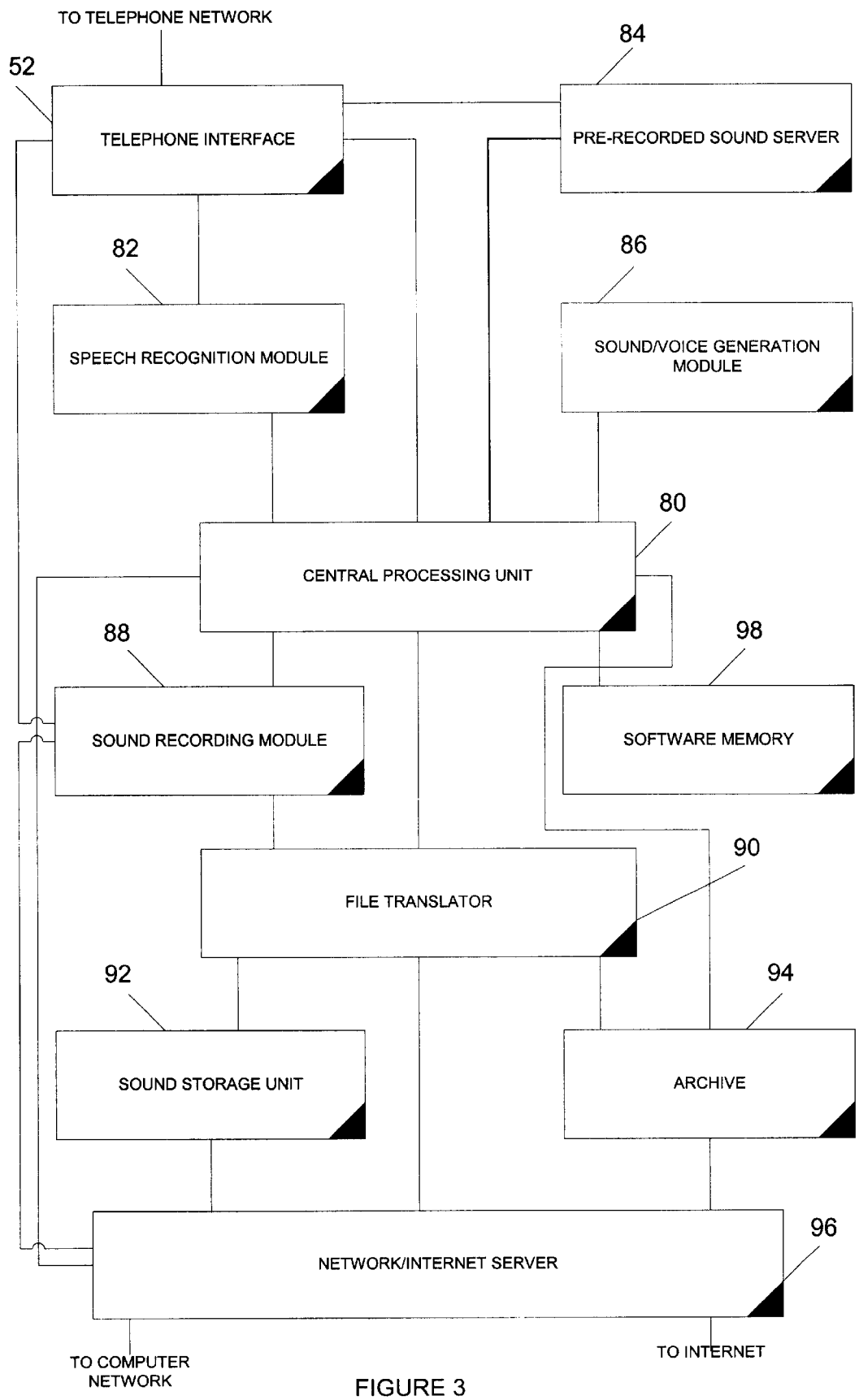
FIG. 3 is a block diagram of elements of an interactive voice response system embodying the invention.

A block diagram showing elements of an IVR system that is configured to record and edit audio descriptions is shown in FIG. 3. The IVR system shown in FIG. 3 could exist independently of a content provider, or the IVR system could be incorporated in and be a part of a content provider.

The IVR system is controlled by a central processing unit 80, which may utilize software stored in a software memory 98. The central processing unit 80 is connected to various other elements of the IVR system. It should be understood that the blocks shown in FIG. 3 are intended to represent functional elements of the IVR system, and each block may or may not represent an actual physical element. Some blocks, such as the speech recognition module 82, may simply be software that is stored on the software memory 98 and run by the central processing unit 80. Also, not all of the blocks shown in FIG. 3 may be present in any particular embodiment of the invention. A complete IVR system embodying the invention could have fewer elements than are shown in FIG. 3.

The IVR system shown in FIG. 3 could interact with a user by telephone, or via a user computer. If interaction is accomplished by telephone, the IVR system would include a telephone interface 52 that is connected to a telephone network.

The IVR system could prompt the user, or pose questions to the user, by playing audio sounds over the user's telephone. The audio sounds could be pre-recorded audio sounds, such as predetermined questions, prompts, or menu choices, that are stored on a pre-recorded sound server 84. The pre-recorded sound server 84 could take the form of a digital data memory device such as a hard disk or an optical disk. In this instance, the pre-recorded sounds would be stored in electronic data files having any appropriate file format. Alternatively, the pre-recorded sound server 84 could be an analog or digital sound recording device such as magnetic or optical tape or disk drives.

Alternatively, the processor 80 could interact with a sound/voice generation module 86 to generate questions, prompts and menus that are custom tailored to specific situations. The sound/voice generation module 86 would most likely be software that is stored on the software memory 98 and that is run by the processor 80. The sound/voice generation module 86 would enable the IVR system to generate audio sounds or speech that is custom tailored to particular situations. For instance, if the IVR system needs to speak a person's name or speak a string of numbers, the sound/voice generation module could be used to speak sounds or strings that have not been pre-recorded.

The IVR system would lead a user through the process of recording and/or editing an audio description using prompts and questions that are played over the user's telephone. In response, the user would provide specific information, issue commands, make menu selections, and eventually provide an audio item description. The user could respond to questions by speaking an answer, or by pressing keys of a keypad on the user's telephone. If the answers are spoken by the user, the speech recognition module 82 would interpret the spoken answers. If the user pushes keys of a telephone keypad, the telephone would generate DTMF sounds that would be interpreted by the IVR system.

Relatively simple spoken answers could be readily interpreted by the speech recognition module 82. Appropriate speech recognition software that is currently available can interpret more complex verbal answers, and the applicants expect that speech recognition software will continue to rapidly improve. Thus, the speech recognition module 82 of an IVR system embodying the invention may include the ability to interpret and respond to complex responses given by the user.

The IVR system may request a control or item number from the user at the beginning of the process of recording a description. The user could provide the control number verbally, or by pushing buttons on a telephone keypad. The IVR system could then store the additional information provided by the user, including the audio item description, against the user-provided control number. In addition, the IVR system may be configured to request a user identification number, and possibly a password from the user. This information could be used by the IVR system to verify that the user is authorized to make a recording, or to edit an existing recording.

Once the user provides the audio description of an item, in response to a prompt from the IVR system, the description could be temporarily or permanently stored on the sound recording module 88. The recording could also be stored on a sound storage unit 92 or on an archive 94. The sound recording module 88, the sound storage unit 92 and the archive 94 could be any type of device capable or recording sounds. This could include analog recording devices such as magnetic tape recorders, as well as digital recording devices that use magnetic or optical tapes or disks as a storage medium. In addition, a sound recording could also be stored, in an electronic digital file format, on a network or Internet server 96.

In some instances, it may be possible for the IVR system to make the initial recording in a format which can be subsequently used by a content provider or end user. In other instances, it may be necessary to make the initial recording in a first format, then translate the recording into a different format which can be used by the content provider, or end users of the content provider. If translation is necessary, the IVR system could include a file translator 90. The file translator 90 could translate a recording made in a first format and stored on the sound recording module 88 into a second file format. The recording in the second file format could then be stored back on the sound recording module 88, or on the sound storage unit 92, or in the archive 94, or on the network/Internet server 96.

As noted above, the IVR system may be part of a content provider, such as a description listing service. However, if the IVR system is separate from the content provider, the use of a control number, a user identification number and/or password may be particularly advantageous. For instance, if a user wants to list an item on a listing service, the user would first interact with the listing service to place the item on the service, and to provide a textual description and possibly an image of the item. The item listing service would then assign a control number for the item. The listing service might also assign an identification number and/or password to the user. The user would then access a separate IVR system to record an audio description of the item. If the user provides the IVR system with the control number assigned by the listing service, the IVR system can store the audio description for the item against the control number assigned by the listing service.

In addition, if the user provides the IVR system with a user identification number and/or password assigned by the listing service, the IVR system can check with the listing service to verify that the user is authorized to record or edit an audio description corresponding to the control number. This provides a level of security that should prevent unauthorized tampering with the recorded audio descriptions.

The use of identification numbers and passwords as a security measure requires that the content provider communicate with the IVR system so that the IVR system will know what user identification numbers and passwords would allow a user to record or edit an item description corresponding to a particular control number. This communication could take the form of periodic data downloads from the content provider to the IVR system. Alternatively, when a user interacts with the IVR system and provides the IVR system with a control number, and a user identification number and/or password, the IVR system could then communicate with the content provider and check to see if the user is authorized to make/edit a recording. The communications between the IVR system and the content provider could be implemented by a dial-up telephone line connection, by a dedicated telephone line connection, by a computer network connection, or via the Internet.

Communications between the content provider and the IVR system can also be used to transfer information about particular users to the IVR system. For instance, if the content provider is a description listing service, and the user of the description listing service would like to record an audio description of an item that can be made available to users of the description listing service, the user would first subscribe to a certain level of audio service at the time the user registers an item with the description listing service. Terms for the audio recording subscription could vary. For instance, the user may be able to choose among different maximum audio description lengths, and from among different lengths of time that an audio description will continue to be made available. The user might also select the ability to re-record his message a set number of times during a given period, or the ability to re-record the message as often as he likes. The cost of the audio service could vary depending on the terms selected by the user.

The terms of a particular user's audio subscription could be communicated to the IVR system the first time that the IVR system contacts the description listing service to verify a particular control number, and any associated user ID and/or password. The content provider could also communicate a user profile that contains various items of information about the user. This would allow the IVR system to configure the audio recording service appropriately. This also eliminates the need for the end user to provide any of the audio subscription term information directly to the IVR system. Alternatively, the questions posed to the user when an audio recording is made could include questions about the desired audio subscription terms. Thus, the IVR system could also obtain this information directly from the user.

Once the IVR system has recorded an audio description of an item, the IVR system must notify the content provider that the recording is ready for use. This communication can be automatically initiated by the IVR system as soon as the recording is complete. The communication could take place by sending a message over the Internet, by communicating over a telephone network, or by any other type of electronic communication. The notification would usually include the control number originally assigned by the content provider.

In addition, once the recording is complete, the IVR system could transfer one or more electronic data files that contain the audio recording to the content provider. Because the audio description would be recorded against the control number assigned by the content provider, the content provider would have no difficulty matching a recorded audio description with the text and image information that was previously provided by the user. Alternatively, the IVR system could store the recordings in files on a server that is accessible to the content provider, or to the end users. For instance, the IVR system could put the recordings on an Internet server that would be accessible to the content provider and/or the end users. In this instance, each audio recording could be stored in an electronic data file having a filename that is indicative of the control number assigned by the content provider service. This would allow the content provider to easily locate and download the file containing a particular audio description based on the control number. Alternatively, it would allow the content provider to direct the end user to the correct file stored on a separate server at the IVR system site.

The above description of the IVR system assumed that a user would interact with the IVR system using a telephone. In other embodiments of the invention, the user could access and interact with the IVR system using a computer. The user's computer could connect with the IVR system through a computer network, such as the Internet, using the network/Internet server 96. Alternatively, the user's computer could access the IVR system using a modem that connects to the IVR system via the telephone interface 52.

If a user utilizes a computer to access the IVR system, the interaction with the user could take place in several different ways. In some embodiments, the user's computer could be used just like a telephone. The IVR system could pose questions and prompt the user by playing sounds over speakers that are connected to the user's computer. The user could respond by speaking responses into a microphone connected to the user's computer, or by pushing keys of a computer keypad. If keystrokes are used for communication, the keystrokes would probably be encoded differently than would occur with a telephone, which generates DTMF sounds. However, the meaning of the keystrokes would essentially remain the same.

The use of a computer, however, can provide greater capabilities for interaction with the user than would be possible with a telephone. For instance, the user could easily provide textual responses that are typed on a computer keyboard. This type of communication would be difficult, at best, for a telephone. In addition, the user could utilize his computer, and appropriate software, to compose a complete audio recording describing an item before the IVR system is contacted. Such sound recordings could incorporate background music and special sound effects that would be difficult to reproduce using a telephone. The user could then connect with the IVR system, input a control number, and possibly a user number and/or password, then transfer one or more electronic files that include the sound recording to the IVR system.

In addition to the above-described benefits, when a user connects with the IVR system using a computer, a graphical interface that appears on the user's computer display screen could be used in place of the spoken prompts, questions and menus that are used with a telephone. The graphical interface could be augmented with audible prompts, questions and menus that are played over speakers connected to the user's computer to provide an audio-visual interactive interface.

Regardless of how an audio recording is created, or where it is stored, a system embodying the invention could be configured to play audio recordings over a user's computer in a variety of different ways. When a user accesses a content provider's web site, the user would typically select an icon with a pointing device, or press one or more keys of a keyboard, to request that an audio description of an item be played. This could cause the content provider's system and the user's computer to do different things, depending on the configuration of the content provider and the capabilities of the user's computer. For instance, the content provider's web site may include two or more icons that can be used to cause different types of files containing the audio description to be downloaded and played. The user would then select the most appropriate icon to get the type of files that the user's computer is configured to use.

In less complex embodiments of the invention, the web browsing or operating system software on the user's computer would be used to play an audio description. This would typically involve downloading one or more electronic files from a server, then using the files to play the audio recording over speakers connected to the computer. The electronic files could come from the content provider's server, or from a remote server.

In the case of a remote server, this could be a server connected to the IVR system which initially made the recording, or some other remote server. The content provider system could direct the user's computer to download files from a remote server using the control number information for a particular item. For instance, the content provider could direct the user's computer to download files on a remote server that have file names indicative of the control number for an item.

In other embodiments of the invention, so-called "plug-in" software, or JAVA, which is designed to operate with existing web browser or operating system software could be used to access the electronic files stored on a server, then play the audio recording stored in the files.

In still other embodiments of the invention, the content provider system could include software configured to check a user's computer to determine if appropriate player software already exists on the user's computer. If the content provider determines that at least one compatible player program exists, one or more electronic files containing an audio description could be downloaded to the user's computer, and the audio description could be played with the resident player software. In this instance, the content provider or a remote server, might provide different types of files (different file formats) depending on the player software stored on the user's computer.

If the content provider determines that no suitable player software exists on the user's computer, the content provider might download appropriate software to the user's computer. The content provider might also be configured to direct the user to a different web site where the user can download the appropriate player software. Furthermore, if the electronic files containing an audio description are not stored on the content provider's web site, and are instead stored on a remote server, the remote server could perform the above described checking and downloading functions.

In other embodiments of the invention, the content provider, or a remote server where the audio recording files are stored, could be configured to download helper programs or applets which could be used to look for existing players software. Also, the helper programs themselves might be used to accomplish the playing function.

In other embodiments of the invention, where the user's computer is capable of streaming in and simultaneously playing an audio file, the audio recordings could be streamed to the user's computer. This would eliminate the need for an entire audio recording file to be downloaded before the audio recording can begin to play.

Figure 4:
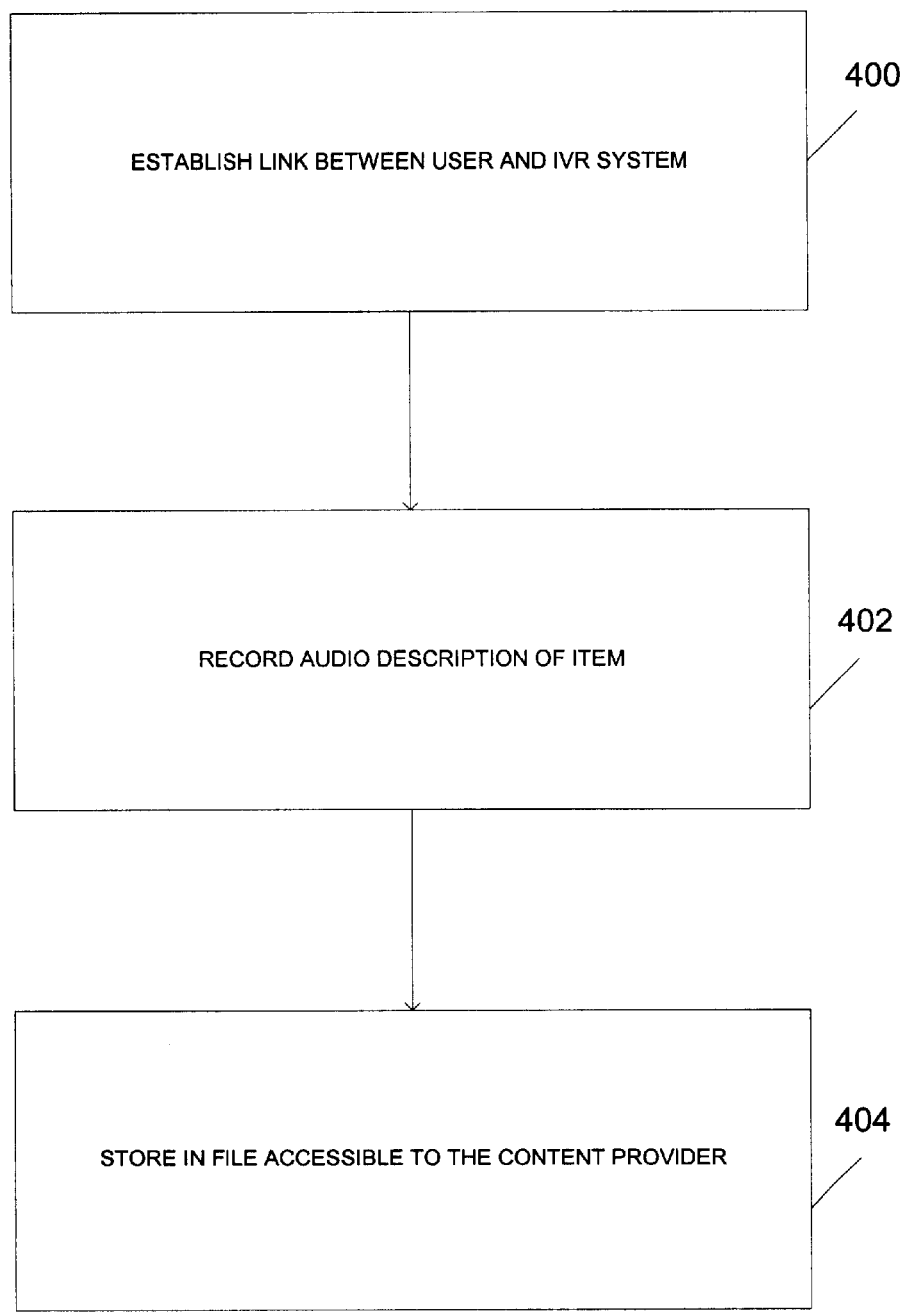
FIG. 4 is a flow chart showing steps of a method embodying the invention.

A method embodying the invention, which includes recording an audio description of the item, and making the recording accessible, is shown in FIG. 4. This method is used where the IVR system is separate from the content provider.

In a first step 400, the user would establish a link with an IVR system using a telephone, a computer, or some other means. Next, in step 402, the IVR system would lead the user through the process of recording an audio description of an item. As noted above, this could include providing an item control number, providing a user identification number, providing a password, and either speaking an audio description of an item, or transferring files containing an audio description to the IVR system. In the end, the audio description provided by the user would be recorded in a suitable format. Next, in step 404, the IVR system would store the audio description in a file that is accessible to a separate content provider. Making the recording accessible to the content provider could occur during the initial recording step. Alternatively, the first recording could be made on a first storage device, then the recording could be transferred to a second storage device that is accessible to the content provider. As also mentioned above, it may be necessary to translate the first recording into a new format that can be used by the content provider.

Figure 5:
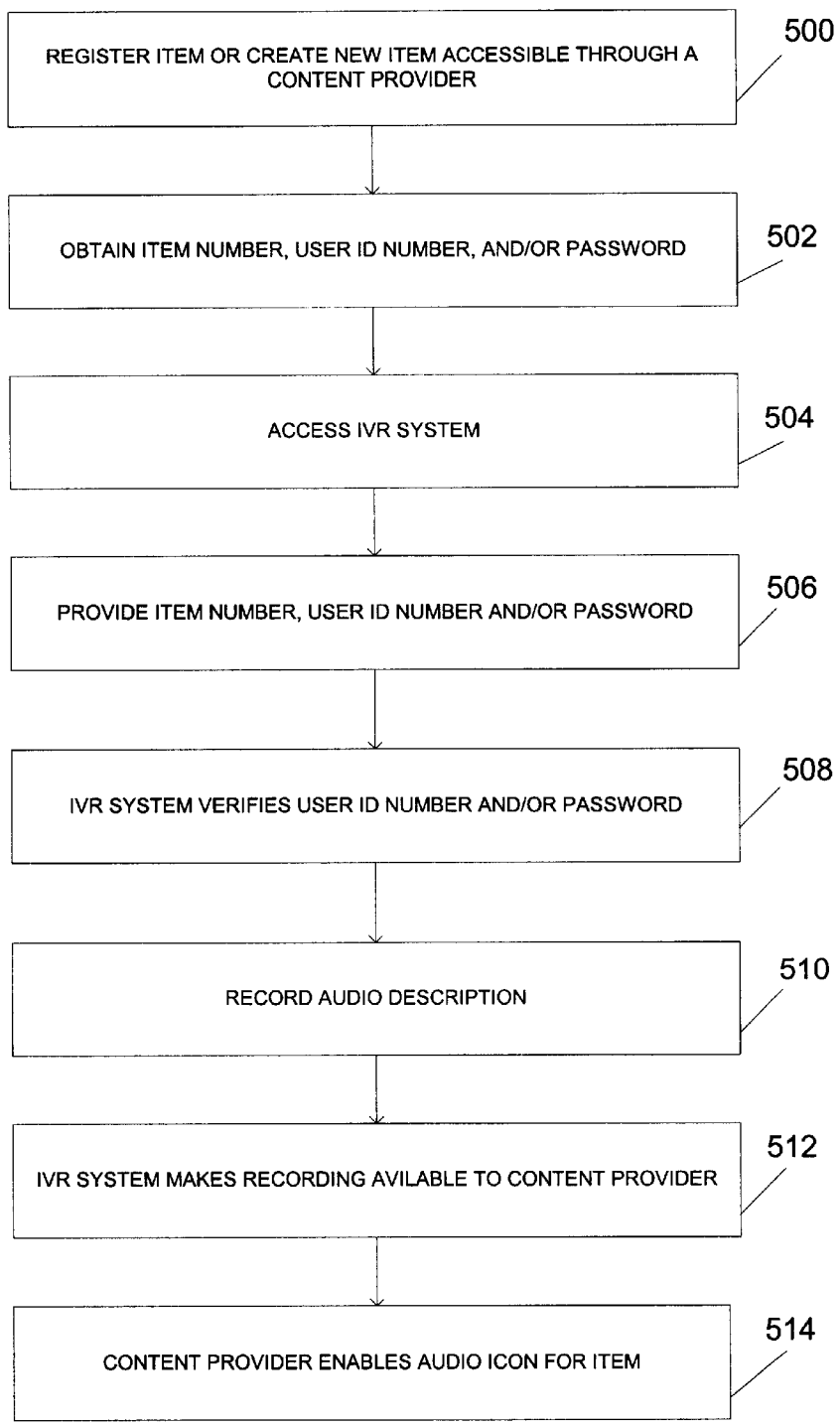
FIG. 5 is a flow chart showing steps of another method embodying the invention.

A second method embodying the invention is shown in FIG. 5. This method also assumes that the IVR system is separate from the description listing service.

In a first step 500, a user would register an item or create a new item that is to be made available through a content provider. In step 502, the content provider would provide the user with an item number and a user identification number and/or a password.

In step 504, the user would establish contact with an IVR recording service. The IVR service would request the item number, the user identification number and/or the password that were assigned by the description listing service. In step 506 the user would provide the IVR service with the item number and the user identification number and/or the password.

In step 508, the IVR system would verify that the item number, the user identification number, and/or the password are valid. This would usually involve establishing contact with the content provider and verifying the numbers.

Provided the IVR system is able to verify the item number, the user identification number and/or the password, in step 510, the IVR system would lead the user through the process of recording an audio description of the subject item.

In step 512, the IVR system would make the audio description provided by the user available to the content provider. As mentioned above, this could include transferring files to the content provider, or loading the files onto a network server that is accessible to the content provider. The initial recording might be translated into a different format that is easier for the content provider or an end user to play. This step could also include notifying the content provider that the item description has been recorded and that files containing the description are available for use.

In step 514, the content provider would take whatever steps are necessary to indicate to their customers that the audio recording is available. This could include adding an icon to a web page describing the item, or simply enabling an end user to access the audio recording.

Figure 6:
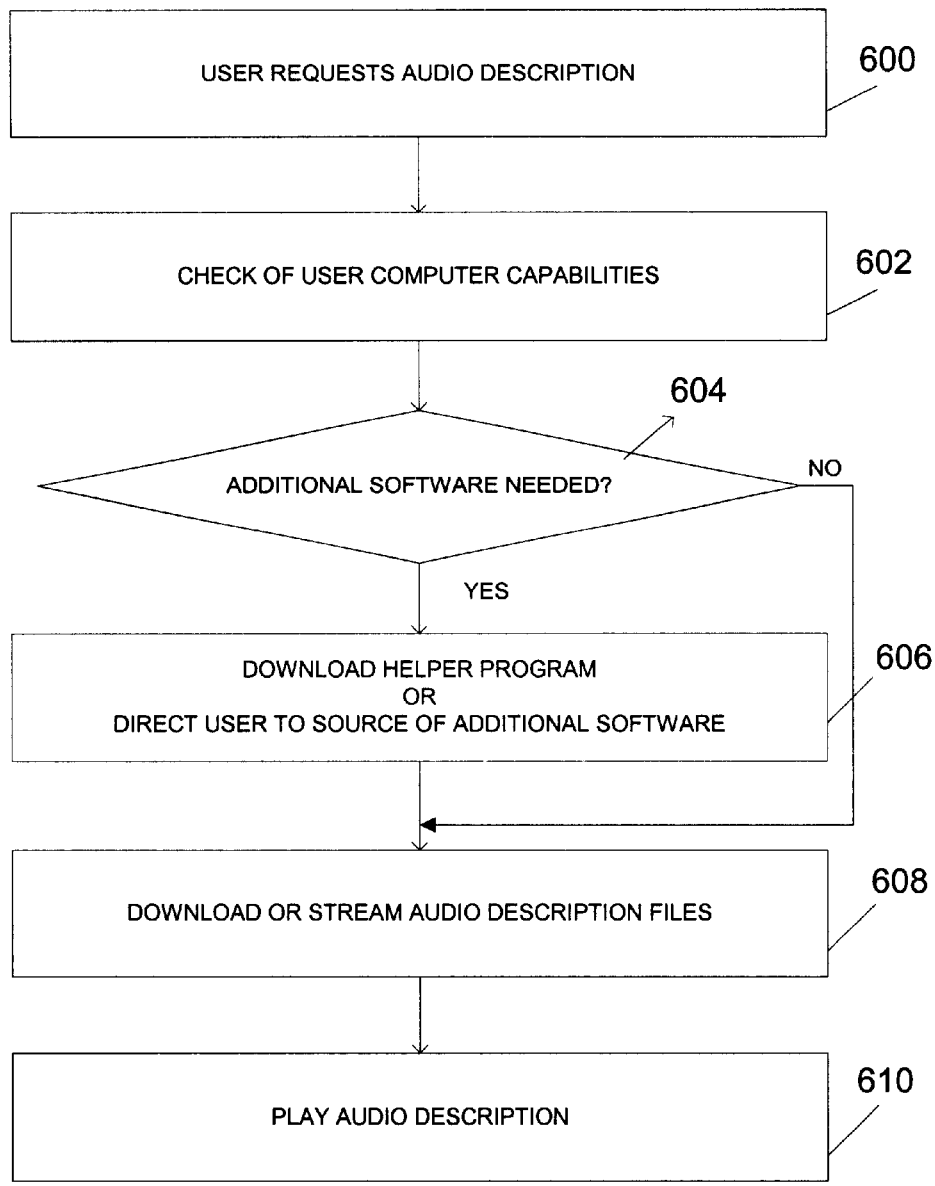
FIG. 6 is a flow chart showing steps of yet another method embodying the invention.

Steps of another method embodying the invention are shown in FIG. 6. In step 600 of this method, a user would request that an audio description be played. This would typically occur when a user is viewing items on a content provider's web site. The request that an audio description be played could occur when a user selects an icon with a pointing device, or when a user presses one or more keys of a keyboard. The way that a user requests that an audio description be played will vary depending on the content provider's web site, and the graphical or audio-visual interface used by the content provider.

In step 602, a check would be performed to determine if the user's computer has any player software that could be used to play the audio description. This check could be performed by the content provider's computer system. Alternatively, the content provider could re-direct the user's computer to a separate server once the user's computer requests that an audio description be played. For instance, when the user's computer requests that an audio description be played, the content provider's server could re-direct the user computer's browser software to the server of an IVR system that originally recorded and stored the audio description. The remainder of the process of downloading and playing an audio description could then be controlled by:software resident on the IVR system server.

In step 604, a decision is made as to whether the software resident on the user's computer will be sufficient to play the audio description. If no additional software is needed, and a suitable program already exists ono the user's computer, the method will proceed to step 608. If no suitable player software exists on the user's computer, and additional software is needed, then the method proceeds to step 606.

In step 606, the computer system controlling the playing operation would either download appropriate software to the user's computer, or direct the user computer's browser to a web site that can provide the appropriate software. Once the user's computer is configured with the appropriate software, the method would proceed to step 608.

In step 608, one or more electronic files that contain the audio description would be sent to the user's computer. In some cases, this would involve first downloading files, then playing the files with the player software. In other instance, the audio description files could be streamed to the user's computer, and simultaneously played. If the audio data files are streamed, the user would not have to wait for an entire file to be downloaded before the audio description begins to play.

In step 610, the audio description would be played to the user over speakers attached to the user's computer. Where streaming of the audio is possible, the playing step (610) could occur at least partly simultaneously with the downloading step (608).

The process of translating an audio description into a suitable file format, placing the file on an Internet accessible saver, and notifying a content provider that the file is available for use can all occur in a matter of seconds. Also, an IVR system embodying the invention may be configured to handle many calls simultaneously. Thus, upwards of hundreds of callers can be recording audio descriptions simultaneously using the same IVR system.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for recording an audio description of an item, comprising:

an interactive voice response system configured to interact with a user through the user's computer and to record an audio description of an item provided by the user by speaking into a microphone connected to the user's computer, wherein the interactive voice response system is also configured to request a user to input a predefined control number, to record and interpret a user's response to said request, and to store the recorded audio description, in at least one electronic data file having a filename that incorporates the predefined control number; and an electronic memory device for storing electronic data files created by the interactive voice response system, wherein the electronic memory device is configured to interact with a separate computer system and to provide the data files to the separate computer system upon demand.

2. The system of claim 1, wherein the interactive voice response system and the user's computer communicate with one another over at least one of the Internet, a wide area network, a local area network, and a telephone network.

3. The system of claim 1, wherein the interactive voice response system is configured to present the user with options via at least one of audio prompts and a graphical interface that are played or displayed to the user over the user's computer.

4. The system of claim 1, wherein the interactive voice response system is configured to respond to user commands that the user issues by speaking into a microphone connected to the user's computer.

5. The system of claim 1, wherein the interactive voice response system is configured to respond to user commands that the user issues by pushing buttons on a keypad connected to the user's computer, or that the user issues by using a pointing device connected to the user's computer.

6. The system of claim 1, wherein the interactive voice response system includes a translator for translating audio recordings that are stored in a first electronic data file format into a second electronic data file format.

7. The system of claim 1, wherein the electronic memory device comprises a server configured to store files and to provide the files to other computers upon demand.

8. The system of claim 7, wherein the server is an Internet server that is connected to the Internet, and wherein the server is configured to provide data files that contain audio descriptions to other computers upon demand.

9. The system of claim 1, wherein the interactive voice response system is configured to request a user to input a user identification number, and wherein the interactive voice response system is configured to record and interpret a user's response to the request for a user identification number.

10. The system of claim 9, wherein the interactive voice response system is configured to check a user identification number supplied by a user against a list of valid user identification numbers, and wherein the interactive voice response system will only allow the user to record an audio description of an item if the user identification number supplied by the user matches a valid user identification number.

11. The system of claim 1, wherein the interactive voice response system is configured to store a recorded audio description in at least one electronic data file having a filename that reflects the predefined control number.

12. A method of recording an audio description of an item, comprising the steps of:
   requesting a predefined control number from a user with an interactive voice response system via the user's computer;
   prompting the user to provide an audio description of an item with the interactive voice response system via the user's computer;
   recording an audio description provided by the user by speaking into a microphone connected to the user's computer; and
   storing the recorded audio description, in at least one electronic data file having a filename that incorporates the predefined control number, on a server that is configured to provide electronic data files to other computer systems upon demand.

13. The method of claim 12, wherein the prompting step comprises at least one of playing audio prompts and displaying a graphical interface to the user via the user's computer.

14. The method of claim 12, further comprising a step of interpreting commands issued by the user.

15. The method of claim 14, wherein the interpreting step comprises interpreting verbal commands that the user speaks into a microphone connected to the user's computer.

16. The method of claim 14, wherein the interpreting step comprises interpreting commands that the user issues by pressing keys of a keypad connected to the user's computer, or that the user issues by using a pointing device connected to the user's computer.

17. The method of claim 12, wherein the storing step comprises storing the recorded audio description in at least one electronic data file having a filename that is indicative of the control number provided by the user.

18. The method of claim 17, wherein the storing step comprises storing the recorded audio description on an Internet server that is configured to provide the at least one electronic data file to other computers connected to the Internet.

19. The method of claim 12, wherein the storing step comprises storing the recorded audio description in at least one electronic data file having a first file format, and further comprising a step of translating the at least one electronic data file into a second file format.

20. A system for recording an audio description of an item, comprising:
   an interactive voice response system configured to interact with a user through the user's computer and to record an audio description of an item provided by the user by speaking into a microphone connected to the user's computer, wherein the interactive voice response system is also configured to receive a predefined control number from an external source, and to store the recorded audio description in at least one electronic data file having a filename that incorporates the predefined control number; and
   an electronic memory device for storing electronic data files created by the interactive voice response system, wherein the electronic memory device is configured to interact with a separate computer system and to provide the data files to the separate computer system upon demand.

21. A method of recording an audio description of an item, comprising the steps of:
   receiving a predefined control number from an external source by an interactive voice response system;
   prompting a user to provide an audio description of an item with the interactive voice response system via a user's computer;
   recording an audio description provided by the user by speaking into a microphone connected to the user's computer; and
   storing the recorded audio description, in at least one electronic data file having a filename that incorporates the predefined control number on a server that is configured to provide electronic data files to other computer systems upon demand.

* * * * *